(12) United States Patent
Griffith et al.

(10) Patent No.: US 8,519,315 B2
(45) Date of Patent: Aug. 27, 2013

(54) MIRROR STRUCTURE HAVING A FOURIER LENS DISPOSED BETWEEN A REFLECTIVE SURFACE AND AN INTEGRATED OPTICAL SENSOR

(75) Inventors: Michael Stewart Griffith, Chelmsford (GB); Leslie Charles Laycock, Chelmsford (GB); Peter Blyth, Milton Keynes (GB)

(73) Assignee: BAE Systems PLC, London (GB)

( * ) Notice: Subject to any disclaimer, the term of this patent is extended or adjusted under 35 U.S.C. 154(b) by 291 days.

(21) Appl. No.: 13/129,382

(22) PCT Filed: Nov. 5, 2009

(86) PCT No.: PCT/GB2009/051489
§ 371 (c)(1),
(2), (4) Date: May 13, 2011

(87) PCT Pub. No.: WO2010/058193
PCT Pub. Date: May 27, 2010

(65) Prior Publication Data
US 2011/0211190 A1    Sep. 1, 2011

(30) Foreign Application Priority Data
Nov. 19, 2008  (EP) .................................. 08275077
Nov. 19, 2008  (GB) ................................. 0821152.6

(51) Int. Cl.
*G01J 1/20*       (2006.01)
(52) U.S. Cl.
USPC ........................ 250/201.9; 250/216

(58) Field of Classification Search
USPC ................... 250/201.9, 216, 214.1, 239, 226; 356/121–127; 359/559–566, 291–294
See application file for complete search history.

(56) References Cited

U.S. PATENT DOCUMENTS
4,141,652 A  *  2/1979  Feinleib ........................ 356/121
4,737,621 A      4/1988  Gonsiorowski
(Continued)

FOREIGN PATENT DOCUMENTS
EP    0546811 A    6/1993
EP    1371443 A1   12/2003
(Continued)

OTHER PUBLICATIONS

International Preliminary Report on Patentability in related International application No. PCT/GB2009/051489 mailed Jun. 3, 2011.
(Continued)

*Primary Examiner* — Que T Le
(74) *Attorney, Agent, or Firm* — Pillsbury Winthrop Shaw Pittman LLP

(57) ABSTRACT

A mirror structure is provided in which at least a portion of a wavefront sensor is integrated with a mirror. In particular, a mirror structure is provided in which a Hartmann mask or a microlens array of a Shack-Hartmann wavefront sensor is integrated with a mirror to provide a very compact wavefront detector/corrector in a single device. Such a mirror structure may be used with a tip-tilt stage in a laser cavity to provide much simplified adaptive optics in the cavity. Furthermore, a Hartmann Mask may be integrated with self deforming mirror comprising an active PZT layer bonded to a passive mirror substrate, wherein the Hartmann Mask comprises an array of apertures formed through the active PZT layer.

19 Claims, 11 Drawing Sheets

(56) References Cited

U.S. PATENT DOCUMENTS

| | | |
|---|---|---|
| 4,871,250 A | 10/1989 | Koseki |
| 5,166,504 A | 11/1992 | Protz |
| 6,100,969 A | 8/2000 | Perez |
| 6,163,381 A | 12/2000 | Davies et al. |
| 6,717,661 B1 | 4/2004 | Bernstein |
| 7,327,470 B2 | 2/2008 | Arieli et al. |
| 2005/0006559 A1 | 1/2005 | Smith |

FOREIGN PATENT DOCUMENTS

| | | | |
|---|---|---|---|
| GB | 2133531 A | | 7/1984 |
| WO | 2005124425 A2 | | 12/2005 |
| WO | 2008133648 A | | 11/2008 |

OTHER PUBLICATIONS

Search Report in related International application No. PCT/GB2009/051489 mailed Aug. 3, 2010.

Search report in related Application No. GB0821152.6 dated Feb. 2, 2009.

Search report in related European Application No. 08275077 dated Apr. 6, 2009.

Search report in related European Application No. 08275077 dated May 29, 2009.

\* cited by examiner

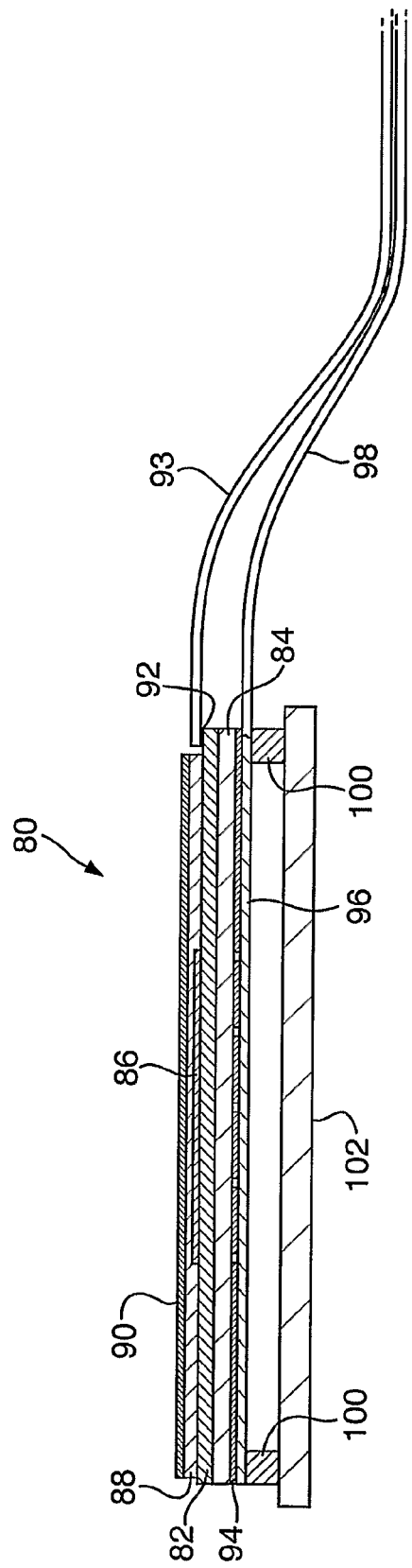

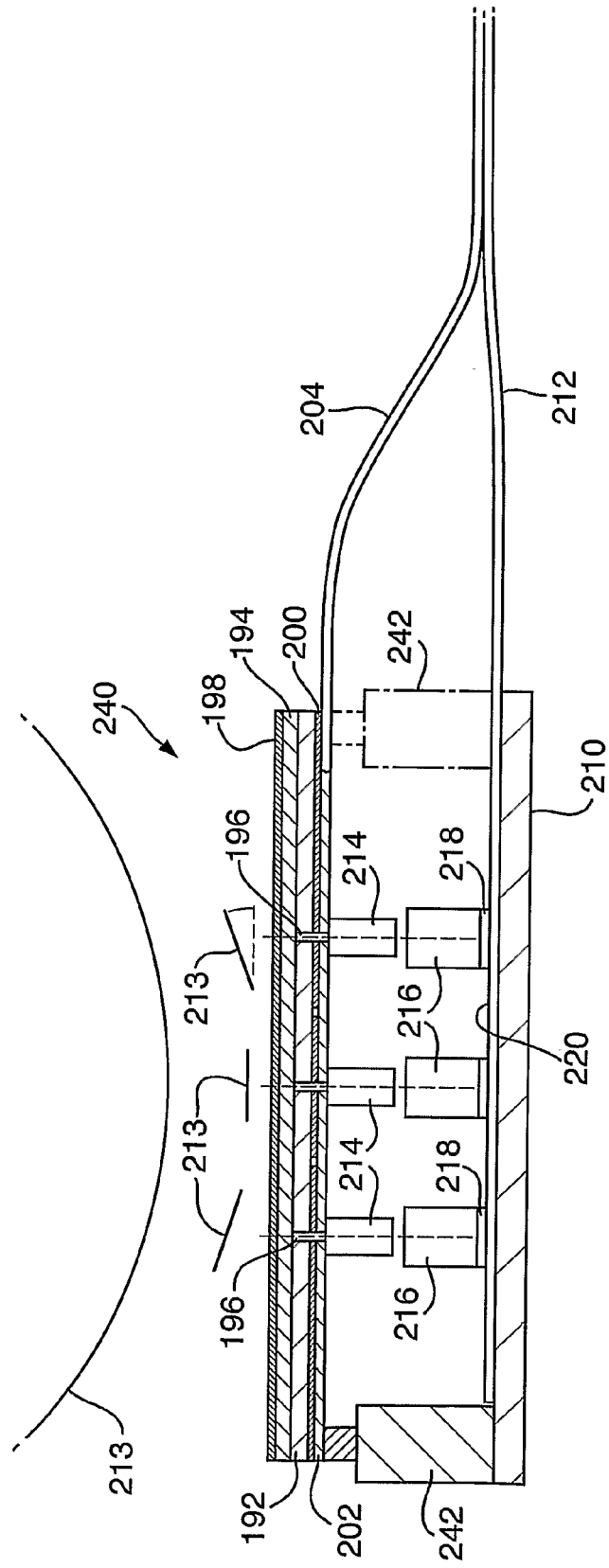

MIRROR STRUCTURE HAVING A FOURIER LENS DISPOSED BETWEEN A REFLECTIVE SURFACE AND AN INTEGRATED OPTICAL SENSOR

CROSS REFERENCE TO RELATED APPLICATIONS

This is the U.S. National Phase of PCT/GB2009/051489, filed Nov. 5, 2009, which claims priority to British Patent Application No. 0821152.6, filed Nov. 19, 2008 and European Patent Application No. 08275077.9 filed Nov. 19, 2008, each of which are incorporated by reference herein in their entireties.

The present invention relates to mirror structures and in particular, but not exclusively, to a mirror structure in which at least a part of an optical wavefront sensor is integrated with a mirror. Such devices are particularly suited to use in adaptive laser optics.

Image sensors are used widely as diagnostic tools for lasers, for example to check laser beam quality within a test procedure before a laser system is delivered, but they may also be incorporated into a laser system to sample the laser beam with a beam splitter. Used in this way, the image sensor is limited to providing information on the intensity distribution within the laser beam. An image sensor may comprise a conventional array of charge-coupled devices (CCDs) arranged to detect the profile of light intensity across the width of the laser beam.

A more sophisticated sensor is a standard Shack-Hartmann sensor which comprises a microlens array that samples an incident wavefront over the aperture of the sensor and an image sensor that detects the position of a focussed spot of light in each microlens sub-aperture. Position data from the image sensor provides a measurement of the average wavefront slope across each sub-aperture as represented by the displacement of the respective focussed spot of light from the axis of the respective microlens. In order to provide an accurate representation of the total wavefront, the size of each sub-aperture is made small enough to capture the highest order aberration expected. However, the complexity of subsequent data processing increases rapidly with the number of microlenses in the array, reducing the sensor's speed. The image sensor is generally configured as a square array of individual sensors, such as a CCD array, but an array of position-sensitive detectors (PSDs) may be used alternatively.

Where the application is not photon-limited, it is possible to replace the microlens array with a Hartmann mask. A Hartmann mask is generally a mechanical mask with a square array of apertures. While the principle of operation is the same as for the standard Shack-Hartmann sensor, the Hartmann mask will obstruct more of the incident light than a microlens array.

It is known to use Shack-Hartmann sensors directly as diagnostic tools for deriving wavefront and intensity information for a laser, and hence the intensity profile, as one measure of the quality of a laser beam. In particular, it is known to use either or both of a conventional CCD array and a Shack-Hartmann sensor in conjunction with a wavefront corrector or deformable mirror as part of an Adaptive Optics System, for example in an intra-cavity laser adaptive optics (AO) arrangement.

From a first aspect, the present invention resides in a mirror structure, comprising a mirror having a reflective surface arranged to allow a portion of incident light to pass therethrough and wherein the mirror has at least one component of an optical sensor integrated therewith, arranged to receive light that passes through said reflective surface.

In a preferred embodiment, at least a Hartmann mask of a Hartmann wavefront sensor is integrated with the mirror. If the mirror comprises a mirror substrate with the reflective surface applied thereto, then the Hartmann mask may comprise an array of apertures formed in the mirror substrate. Alternatively, if the mirror comprises a substantially transparent mirror substrate, then the Hartmann mask may be formed in a distinct layer within the mirror structure, for example one applied to a surface of the mirror substrate.

Preferably, the Hartmann mask is covered by a planarisation layer to which said reflective surface is applied. A planarisation layer may provide an optically flat and polished surface on which to apply the reflective surface of the mirror.

In a further preferred embodiment, the at least one component of an optical sensor is a microlens array of a Shack-Hartmann wavefront sensor integrated with the mirror. The microlens array may be covered by a planarisation layer to provide an optically flat polished surface for the reflective surface.

In a further preferred embodiment, the at least one component of an optical sensor is an optical detector. The optical detector may take one of a number of different forms according to what properties of the incident light are to be detected. For example, the optical detector may comprise a charge-coupled device (CCD) or position sensing detector (PSD). Such an optical detector may be integrated with either a plane mirror or with a deformable mirror that has an active layer of deformable material coupled to a passive substrate.

Preferably the optical detector is provided to detect the wavefront slope of the incident light at one or more points across the aperture of the mirror. To achieve this in one preferred embodiment, a Fourier lens is disposed between the reflective surface and the optical detector, arranged to focus an incident beam of light sampled from the incident wavefront onto the optical detector at a position indicative of the wavefront slope. Preferably an array of such Fourier lenses and associated optical detectors may be provided across the aperture of the mirror, each one arranged to sample a different portion of an incident wavefront.

Preferably, the Fourier lens and the optical detector, or each one of them in an array, are attached to the mirror and so arranged to move with the mirror.

In a preferred embodiment, the mirror structure further comprises an inverting lens disposed between the reflective surface and the Fourier lens, wherein the inverting lens is attached to the mirror and so arranged to move with the mirror, and the Fourier lens is fixed relative to the moveable inverting lens and arranged to receive light passing therethrough.

In the preferred Hartmann mask embodiments, the mirror may be a fixed profile mirror or it may be a deformable mirror. In a preferred embodiment, the mirror is a self-deforming mirror comprising an active layer of deformable material coupled to a substantially transparent passive substrate and wherein the Hartmann mask comprises an array of apertures formed in the active layer of deformable material. Of course, if the active layer is formed using a substantially transparent deformable material, such as a known form of single crystal piezo-electric material, then the Hartmann mask may be formed in another way, for example by an array of small apertures in a common electrode layer of the deformable mirror. Preferably each of the preferred Fourier lens embodiments mentioned above may be used in conjunction with this self-deforming mirror and integrated Hartmann mask.

Preferably, the self-deforming mirror is supported by means of one or more passive flexible support elements coupled to a housing and wherein an optical detector is provided within the housing to detect the wavefront slope of the incident light at one or more points across the aperture of the mirror.

The optical sensor in preferred embodiments of the present invention may comprise a Charge Coupled Device (CCD) array, a Position Sensitive Detector (PSD) or array of PSDs, a quad detector or array of quad detectors, or a Hartmann wavefront sensor.

In a preferred embodiment, the mirror structure further comprises a Fourier lens disposed between the reflective surface and the optical sensor, arranged to focus an incident beam of light onto the optical sensor at a position indicative of the wavefront slope. If, as in a preferred embodiment, the Fourier lens and the optical sensor are attached to the mirror and so arranged to move with the mirror, then the measurements from the optical sensor may be used directly to alter the slope or curvature of the reflective surface so that reflected light is directed back along the same path as the incident light before alteration of the reflective surface.

In a further preferred embodiment, an inverting lens may be disposed between the reflective surface and the Fourier lens, wherein the inverting lens is attached to the mirror and so arranged to move with the mirror, and the Fourier lens is fixed relative to the moveable inverting lens and arranged to receive light passing therethrough. In this embodiment, information from the optical sensor may be used directly by a control system to deform the reflective surface to direct reflect incident light in the direction of the axis of the Fourier lens irrespective of the angle of the incident light. Such a facility may be particularly useful in a communications application in which a receiver is located in a fixed direction but incident signals may be arriving from a different direction and need to be reflected towards the receiver.

Mirror structures according to preferred embodiments of the present invention may be mounted on a tip-tilt stage.

From a second aspect, the present invention resides in a laser mirror comprising a mirror structure according to the first aspect, above. Such a device may be used as the main component in a simplified intra-cavity adaptive optics system, removing the need for a separate sensor and wavefront corrector. Because the sensor is integrated behind a mirror surface, only small amounts of light will reach the sensor. While integration of the sensor behind a mirror surface will exclude photon-limited applications such as Astronomy, this type of device is ideal for use with laser systems where interrogation of the wavefront or beam profile often requires some form of attenuation to ensure that excess laser power does not damage the optical sensor.

A mirror structure incorporating at least one component of a Hartmann or a Shack-Hartmann wavefront sensor may be used with a laser cavity in either a closed loop or an open loop configuration.

Preferred embodiments of the present invention will now be described in more detail, by way of example only, with reference to the accompanying drawings of which:

Figure 8:
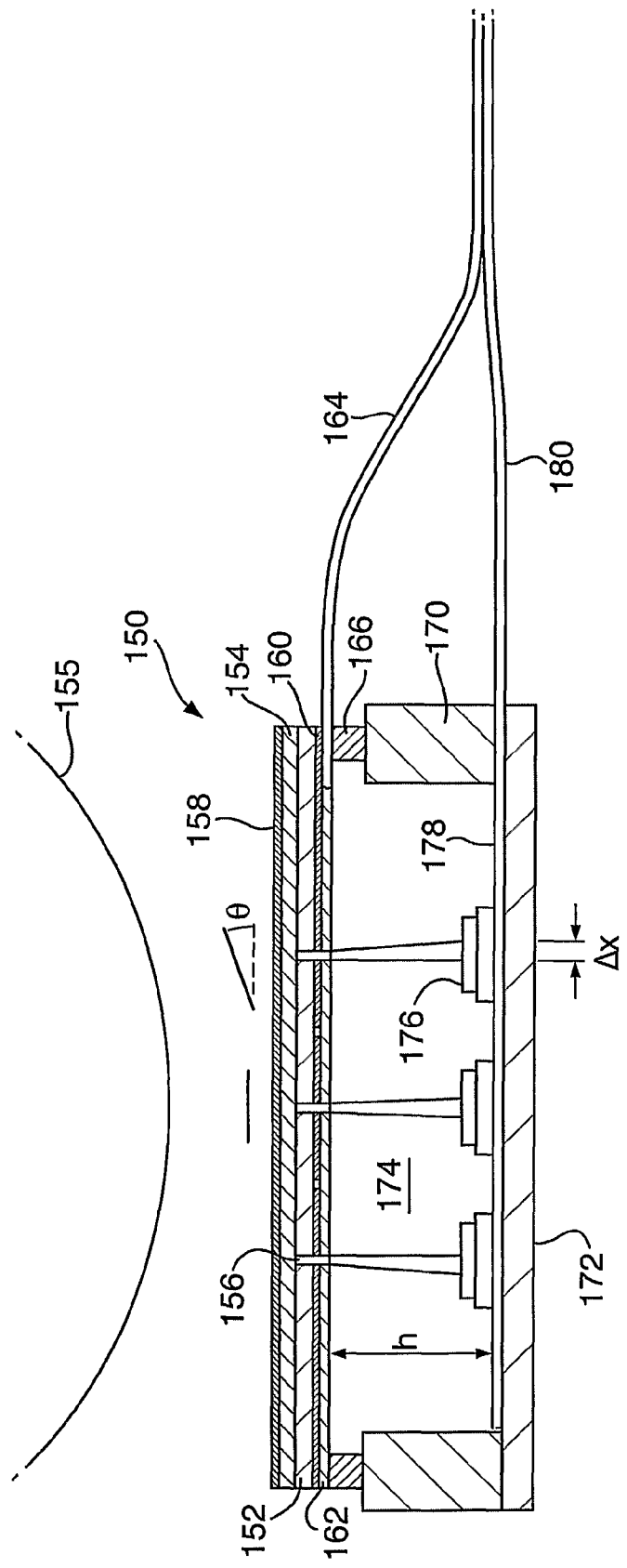
Figure 9:
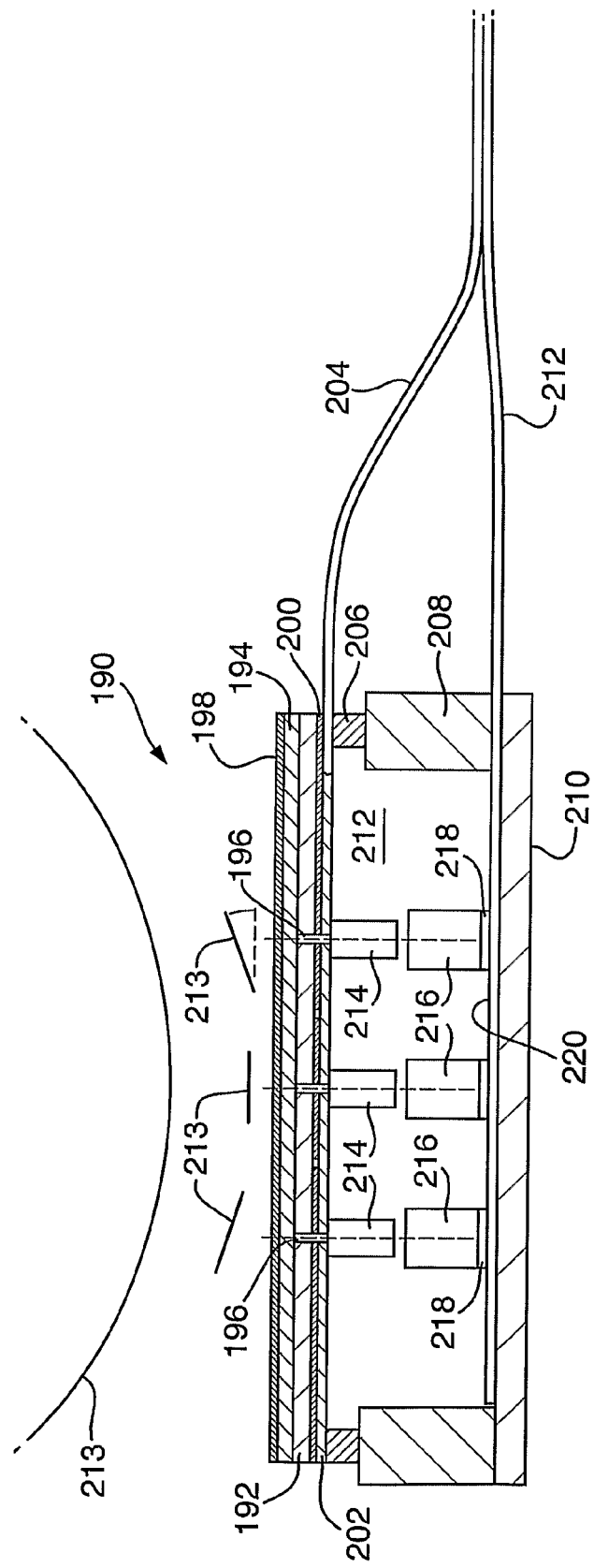

FIG. 4 provides a sectional view and a plan view of an image sensor integrated with a laser mirror, according to a preferred embodiment of the present invention;

FIG. 5 provides a sectional view and a plan view of an image sensor integrated with a deformable mirror, according to a preferred embodiment of the present invention;

FIG. 6 provides a sectional view and a plan view of a mirror structure with an integrated Hartmann mask, according to a preferred embodiment of the present invention;

FIG. 7 provides a sectional view and a plan view of a mirror structure with an integrated Shack-Hartmann sensor, according to a preferred embodiment of the present invention;

FIG. 8 provides a sectional view through a mirror structure comprising a peripherally-supported deformable mirror with an integrated Hartmann mask, according to a preferred embodiment of the present invention;

FIG. 9 provides a sectional view through a mirror structure similar to that shown in FIG. 8, incorporating a novel form of wavefront sensor, according to a preferred embodiment of the present invention;

FIG. 10 provides a sectional view through a portion of the mirror structure shown in FIG. 9;

FIG. 11 provides a sectional view through a mirror structure comprising a deformable mirror supported by tip-tilt actuators and incorporating a novel form of wavefront sensor, according to a preferred embodiment of the present invention; and FIG. 12 provides a sectional view through a portion of a mirror structure incorporating a further type of wavefront sensor, according to a preferred embodiment of the present invention.

Preferred embodiments of the present invention have been devised to incorporate one of several known types of optical wavefront sensor in a mirror structure giving particular advantages in simplifying adaptive optics systems, in particular for use in laser cavities. However, by way of introduction, a known type of wavefront sensor—the Shack-Hartmann sensor—suitable for use in preferred embodiments of the present invention, will firstly be described with reference to FIG. 1.

Figure 1:
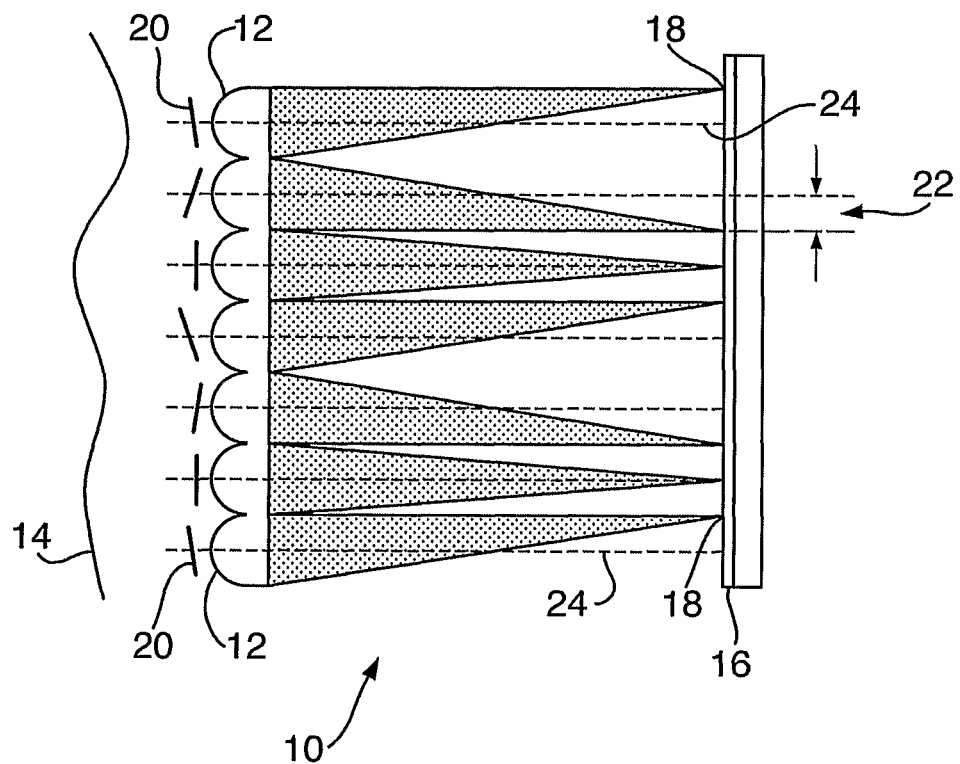
FIG. 1 is a diagram representing a sectional view through a known Shack-Hartmann sensor.

Referring to FIG. 1, a sectional view is provided through a conventional Shack-Hartmann sensor 10 comprising an array of microlenses 12 that each sample an incident wavefront 14 over a sub-aperture of the sensor 10, and an optical sensor 16, comprising an array (typically square) of individual CCDs or PSDs that each detect the position of a focussed spot of light 18 in the respective sub-aperture. Position data from the image sensor 16 provides a set of measurements of average wavefront slope 20 across each sub-aperture as represented by the displacement 22 of the respective focussed spot of light 18 from the axis 24 of the focussing microlens 12.

In order to provide an accurate representation of the total wavefront 14, the size of each sub-aperture, and hence of each microlens 12, is made small enough to capture the highest order aberration that needs to be corrected for. However, the complexity of subsequent data processing increases rapidly with the number of microlenses 12 in the array, reducing the overall rate of response of the sensor 10 to changes in the wavefront 14.

Where the application is not photon-limited, it is known to replace the array of microlenses 12 with a so-called Hartmann mask. A Hartmann mask is generally a mechanical mask with a square array of apertures. While the principle of operation of a sensor incorporating a Hartmann mask is the same as for the conventional Shack-Hartmann sensor 10, the Hartmann mask will obstruct more of the incident light than a microlens array, limiting its use to applications in which the light levels are going to be sufficiently high to be detectable by the image sensor 16 after passing through the Hartmann mask.

A simple known laser cavity structure will now be described briefly with reference to FIG. 2 as one example of a potential application of Hartmann wavefront sensors. Features of this simple laser cavity will be referenced later when discussing applications of the present invention.

Figure 2:
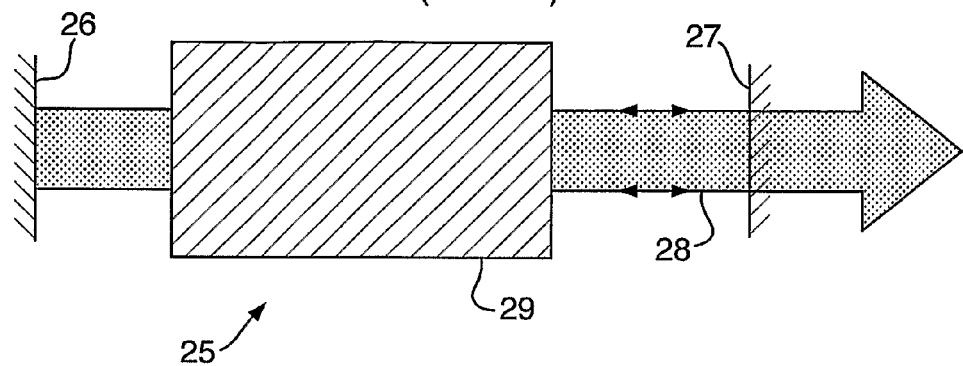
FIG. 2 is a diagram representing a simple known laser cavity.

Referring to FIG. 2, a simple laser cavity 25 is bounded by a first laser mirror 26 and a second, partially reflective laser mirror 27. Within the cavity a laser beam 28 is generated by a lasing medium 29 and travels between the first and second mirrors 26, 27 before being output from the partially reflective second mirror 27.

It is known to use Shack-Hartmann sensors 10 directly as diagnostic tools for deriving wavefront and intensity information for a laser, and hence the intensity profile, as one measure of the quality of a laser beam. In particular, it is known to use either or both of a conventional CCD array and a Shack-Hartmann sensor in conjunction with a wavefront corrector or deformable mirror as part of an Adaptive Optics System, for example in an intra-cavity laser adaptive optics (AO) arrangement as will now be described in outline with reference to FIG. 3.

Figure 3:
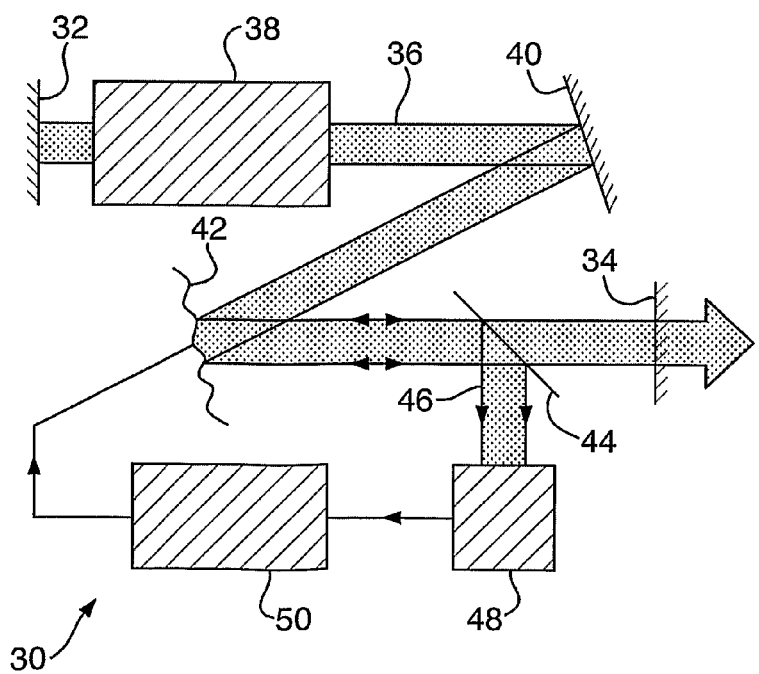
FIG. 3 is a diagram representing a known intra-cavity laser adaptive optics system.

Referring to FIG. 3, a representation is provided of a laser cavity 30 that is bounded by a first laser mirror 32 and a second, partially reflective output mirror 34. A laser beam 36, generated within a lasing medium 38, travels between the first laser mirror 32 and the second, partially reflective output mirror 34 by way of a third, fixed mirror 40 and a deformable mirror 42. Light from the laser beam 36 is sampled by a beam splitter 44 placed in the path of the laser beam 36 between the deformable mirror 42 and the output mirror 34 to direct a portion of light 46 towards a wavefront sensor 48, for example a Shack-Hartmann sensor 10 as described above with reference to FIG. 1, where the wavefront profile of the laser beam 36 may be detected. The wavefront sensor 48 outputs data to a controller 50 which determines, on the basis of those data, an appropriate deformation profile to apply to the deformable mirror 42 so as to make corresponding adjustments to the laser beam wavefront as is reflects from the deformable mirror 42 within the laser cavity 30.

A Shack-Hartmann sensor 10 may be used as a wavefront sensor 48 within the laser cavity 30 in either a closed loop or an open loop configuration. The distortions induced in a laser cavity are generally thermal in nature and so there will be no instantaneous response due to modifications applied by a wavefront corrector such as the deformable mirror 42. For this reason, the controller 50 is generally arranged to implement an adaptive control system based around an iterative search algorithm. In a closed loop configuration such as that shown in FIG. 3, the wavefront sensor 48 is placed after the wavefront correcting deformable mirror 42 so that it will detect any residual wavefront errors. An iterative control algorithm may be implemented by the controller 50 so that the system converges on an optimal level of correction for the laser beam 36. This provides for more accurate wavefront correction than is possible in an open loop system in which the wavefront sensor precedes the wavefront corrector and there is no feedback loop, but its response will be faster than in a closed loop system.

Preferred embodiments of the present invention will now be described which enable a simplification of the adaptive optics intra-cavity arrangement of FIG. 3, amongst other advantages. A first preferred embodiment will be now be described with reference to FIG. 4.

Figure 4A:
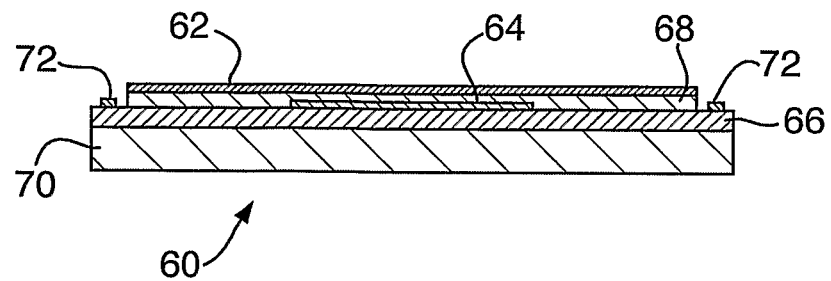
Figure 4B:
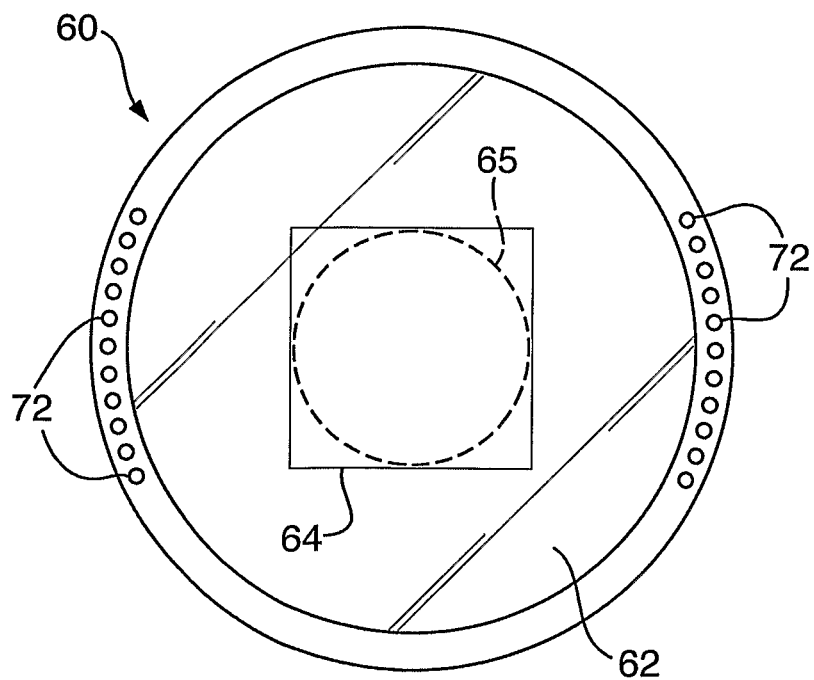

Referring initially to FIG. 4a, a sectional view is provided through a mirror structure 60 comprising a fixed mirror having a reflective surface 62 that is arranged to allow a small amount of light to pass through it, and a CCD or CMOS active pixel sensor array 64 integrated within the mirror structure 60. The integrated sensor array 64 is arranged within the structure 60 such that light that passes through the reflective surface 62 may be detected by the sensor array 64. Referring additionally to FIG. 4b, a plan view is provided of the same mirror structure 60 from a view point above the reflective surface 62.

Preferably, the mirror structure 60 comprises a thin layer (of the order of 300 µm) of silicon 66 on which the CCD or CMOS active pixel sensor array 64 is fabricated using conventional fabrication techniques. The size of the sensor array 64 is chosen to be wider than the intended optical aperture 65 which, in the case of an intra-cavity laser beam, is likely to be significantly less wide than the diameter of the reflective surface 62 and most likely confined to the central region of that surface 62. A planarisation and/or passivation layer 68, preferably of silicon dioxide or silicon nitride, or one layer of each, is applied to cover the sensor array 64 to a thickness sufficient to enable an optically flat polished surface to be provided above the sensor array 64, suitable for the application of the reflective surface 62. A passivation layer, in particular, may be required to ensure that any electrically conducting tracks on the surface of the silicon layer 66 are not shorted, in particular if the reflective surface 62 is provided by a coating of gold, for example. A planarisation layer may be required for example if the sensor array fabrication process leaves behind small surface features, for example tracking or exposed circuitry, which would lead to undesirable "print-through" on the reflective surface 62. A planarisation layer would provide for a high quality, optically flat reflective surface 62.

The planarisation/passivation layers 68 are required to be at least partially transparent to light at the operating wavelength for the mirror, e.g. for a laser mirror, so that light may reach and be detectable by the sensor array 64.

Preferably the silicon layer 66 is bonded to a rigid and supportive carrier layer 70, preferably made from un-processed silicon or silicon carbide so as to have a similar expansion coefficient to the silicon layer 66 and, in the case of silicon carbide, to provide a highly thermally conductive layer to assist in the efficient removal of heat from the mirror structure 60 when applied to laser cavities. Because the silicon layer 66 is likely to be thin (e.g. 300 µm), it may be beneficial during assembly of the structure 60 to bond the silicon layer 66 to the carrier layer 70 before the planarisation/passivation layer 68 is polished flat, to provide additional support.

Preferably, the electrically conducting tracks to the sensors of the array 64 extend to the periphery of the silicon layer 66 and terminate with serial output pads 72 provided around the periphery of the mirror structure 60. Interconnection to the peripheral serial output pads 72 may be achieved in a number of known ways, for example using a flexi-circuit of a type described in published international patent application WO 2005/124425, an elastomeric connector, wire bonding or soldering.

The level of attenuation to be introduced by the reflective surface coating 62 of the mirror is determined by a requirement to match, in a given application, the intensity of light transmitted to the sensor array 64 to the sensitivity of the sensors in the array 64. The reflective surface 62 preferably comprises a coating of gold, enhanced gold or a multi-layer dielectric coating.

In an alternative arrangement of the mirror structure 60, the sensor array 64 may be integrated/bonded to a deeper layer within the mirror structure 60, or even to the lowest surface of the mirror structure, if the intermediate layer or layers of substrate material are sufficiently transparent.

The mirror structure 60 with the integrated sensor array 64, described above, may be used in any number of known configurations. For example, in the laser cavity 30 described above with reference to FIG. 3, the mirror structure 60 may replace one or both of the first or second laser mirrors 32 or 40. This would simplify the laser cavity 30, removing the need for the beamsplitter 44 and separate sensor 48. If two such mirror structures 60 are incorporated in the laser cavity 30, each may contribute different measures of laser beam quality to an adaptive optics control system.

The mirror structure 60 may be used in conjunction with an iterative search algorithm to control a deformable mirror for intra-cavity adaptive optics. One such algorithm is a hill-climbing algorithm which modifies the deformable mirror to maximise the optical power within a specific 'software aperture' on the sensor array 64. This type of algorithm is particularly suited to intra-cavity adaptive optics where the slow response of the cavity means that, after an adjustment of the deformable mirror, the cavity needs to be left to stabilise before any further adjustments are made.

The mirror structure 60 as described above with reference to FIG. 4 may be integrated directly onto a tip-tilt stage. In this case the tip-tilt mirror structure with its integrated sensor array may replace the first laser mirror 26 in the simple uncorrected laser cavity 25 of FIG. 2 to enable adaptive optics capability to be retro-fitted into an existing laser. In addition, the integrated sensor array may be added to an active element to provide intra-cavity adaptive optics without the need to modify the cavity design.

In a second preferred embodiment of the present invention, a mirror structure similar to the structure 60 described above, excluding the carrier layer 70, may form the basis of a deformable mirror structure, as will now be described with reference to FIG. 5.

Referring to FIG. 5, a sectional view is provided through a self-deforming mirror structure 80 comprising a thin (of the order of 300 µm) passive substrate layer 82, preferably of silicon and corresponding to the silicon layer 66 in FIG. 4, bonded to an active PZT layer 84. A sensor array 86 has been fabricated on the silicon layer 82 by conventional fabrication techniques, and a planarisation and/or passivation layer 88 has been applied to cover the sensor array 86 and any associated tracks to provide an optically flat surface for the application of an at least partially transmissive reflective surface 90. Sensor output connection pads 92 are provided around the periphery of the deformable mirror structure 80 for interconnection via a cable 93 with the sensor array 86.

The active PZT layer 84 is provided on one face with a thin continuous electrode layer (not shown in FIG. 5), sandwiched between the silicon layer 82 and the PZT layer 84, and on the other face with a patterned array of electrodes 94 to enable selected regions of the PZT layer 84 to be energised and thus deformed. Preferably a flexi-circuit 96 of the type referenced above may be connected to the electrodes 94 and an interconnect cable 98 may be provided to enable voltages to be supplied selectively to the electrodes 94. The self-deforming parts (82 to 96 in FIG. 5) of the mirror structure 80 are supported from below around their periphery by means of one or more compliant support elements 100 mounted on a rigid base 102.

Whereas, in the mirror structure 80, the silicon layer 82 is bonded to a patterned PZT layer 84 to form a deformable mirror, it may alternatively be bonded to an array of actuators, for example piezo-tubes, PZT stacks or MEMS actuators to form a zonal deformable mirror. The silicon layer 82 may alternatively be added to a true bimorph deformable mirror structure, or form the top layer of a symmetric bimorph structure.

As an alternative to PZT, the layer of active material 84 may comprise a layer of a single crystal piezo-electric material of which known examples are substantially transparent to light, or a layer of an electrostrictive material.

The mirror structure 80 may conveniently be retro-fitted into an existing laser cavity, for example replacing the first laser mirror 26 in the simple laser cavity 25 of FIG. 2 to enable adaptive optics to be added without increasing the complexity of the cavity. The usefulness of a deformable mirror in a simple laser cavity 25 is dependent upon the width of the laser beam 28 within the cavity 25. If the beam width is too small then only the very lowest order distortion (e.g. spherical) would be correctable by the mirror structure 80. However, such a mirror structure 80 may still prove very useful; the main optical distortion that will be present in a cavity will be driven by thermal lensing.

Preferably, the silicon layer 82 on which the sensor 86 is fabricated may also be used to house deformable mirror driver circuits. In this instance the flexi-circuit 96 that is used to supply voltages to the electrodes 94 would be interconnected with the driver circuits fabricated on the silicon layer 82.

In a third preferred embodiment of the present invention, a mirror structure will now be described with reference to FIG. 6 in which a Hartmann mask is integrated with a laser mirror.

Figure 6A:
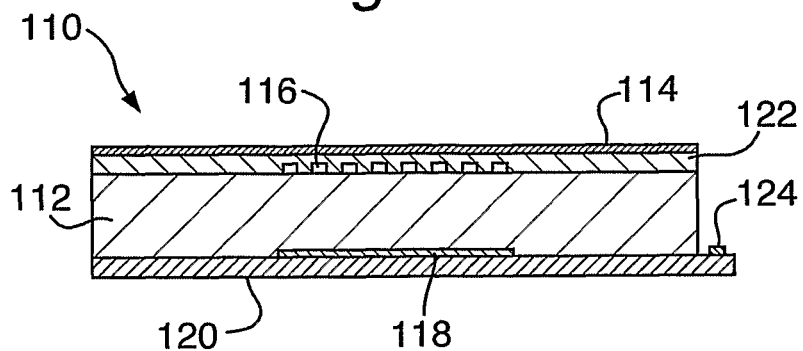
Figure 6B:
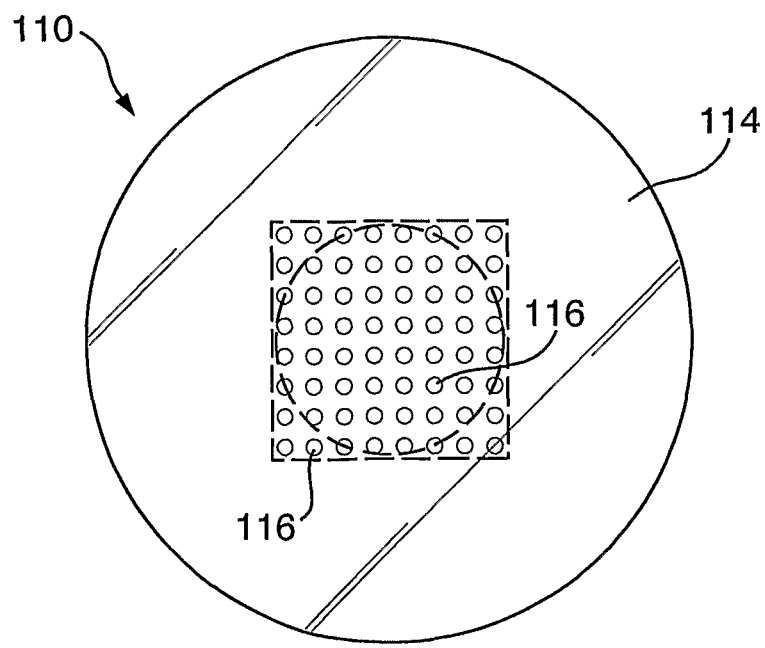

Referring initially to FIG. 6a, a sectional view is provided through a mirror structure 110 comprising a transparent mirror substrate 112, made from glass for example, a reflective surface 114 that is arranged to allow a small amount of light to pass through it, a Hartmann mask 116 disposed between the reflective surface 114 and the mirror substrate 112 and a sensor 118 fabricated on a layer of silicon 120 or other semiconductor material, arranged to receive light transmitted through the reflective surface 114, the apertures of the Hartmann mask 116 and the mirror substrate 112. Referring additionally to FIG. 6b, a plan view is provided of the same mirror structure 110 viewed from a position above the reflective surface 114.

The Hartmann mask 116 may comprise either a pre-formed Hartmann mask that is bonded to the mirror substrate 112 or a Hartmann mask formed by photolithography directly onto the surface of the mirror substrate 112.

A planarisation layer 122 is provided to cover the Hartmann mask 116 and to provide an optically flat and transparent polished surface onto which the reflective surface 114, comprising a thin deposit of gold for example, is formed. Alternatively, the Hartmann Mask 116 may be bonded between two glass substrates.

The depth of the mirror substrate 112, and hence the separation of the sensor 118 from the Hartmann mask 116, is selected according to the maximum wavefront slope that needs to be measured and the resolution of the sensor 118. The sensor 118 may comprise a conventional CCD or an array of PSDs as described above, covered if necessary by a planarisation layer (not shown in FIG. 6) to give a flat contact surface with the mirror substrate 112, and may be mounted on the back of the mirror substrate 112 in such a way that it may be replaced if necessary. Interconnection to the sensor is provided by means if connection pads 124 provided around the periphery of the silicon layer 120.

For applications that involve use of the mirror structure 110 in a harsh environment, the sensor 118 may be hermetically bonded to the back of the mirror substrate 112.

In view of the high level of optical attenuation provided by the combination of a reflective surface coating 114 and a Hartmann Mask 116, the mirror structure 110 according to this third preferred embodiment is likely to be used in a high power laser system.

In a fourth preferred embodiment of the present invention, a mirror structure is provided in which a microlens array and a sensor are integrated with a laser mirror to provide an integrated Shack-Hartmann sensor. The mirror structure according to this fourth preferred embodiment will now be described with reference to FIG. 7.

Figure 7A:
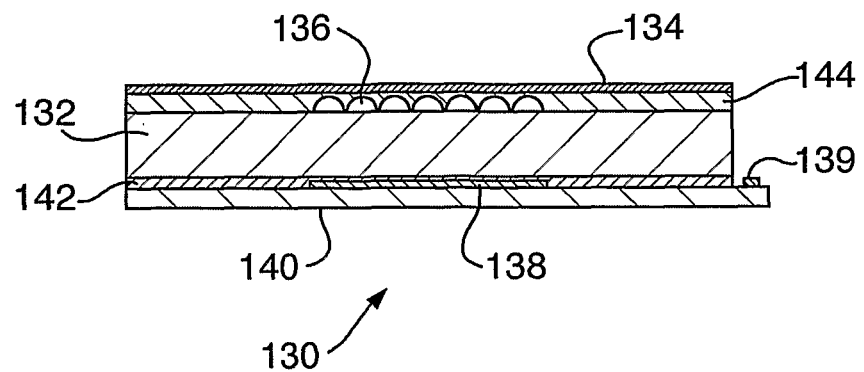
Figure 7B:
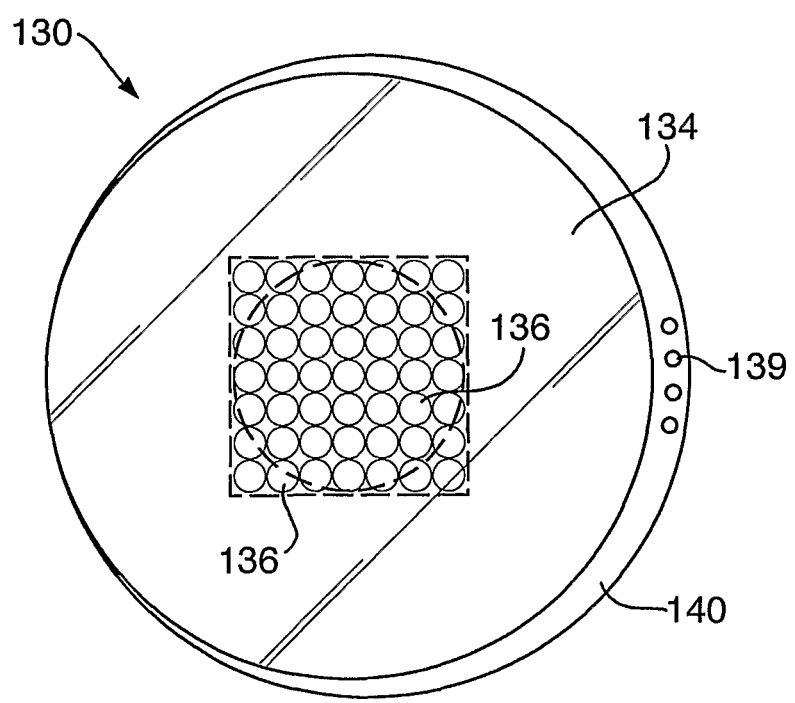

Referring initially to FIG. 7a, a sectional view is provided through a mirror structure 130 comprising a transparent mirror substrate 132, made from glass for example, a reflective surface 134 that is arranged to allow a small amount of light to pass through it, a microlens array 136 disposed between the reflective surface 134 and the mirror substrate 132 and an optical sensor 138 arranged to receive light transmitted through the reflective surface 134, the microlens array 136 and the mirror substrate 132. Referring additionally to FIG. 7b, a plan view is provided of the same mirror structure 130 viewed from a position above the reflective surface 134.

In common with the sensors used in preferred embodiments described above, the sensor 138 comprises an CCD or an array of PSDs fabricated on a layer of silicon 140 or other semi-conductor material, covered if necessary with a planarisation layer 142 to provide a flat surface for bonding to the mirror substrate 132. Connection pads 139 are provided, as above, for interconnection with the sensor 138. A further planarisation layer 144 is formed to cover the microlens array 136 for the purpose of providing an optically flat polished surface ready to receive a layer of gold, for example, to form the reflective surface 134. However, in order for the microlenses in the array 136 to function as lenses, the microlenses are formed using a material with a different refractive index to the material forming the planarisation layer 144.

In common with the third preferred embodiment described above, the depth of the transparent mirror substrate 132 is selected according to the maximum wavefront slope to be measured and the resolution of the sensor 138.

In common with the integrated Hartmann sensor mirror structure 110 described above, the integrated Shack-Hartmann sensor mirror structure 130 may be used as the mirror for a tip-tilt stage and may replace the first laser mirror 26 of the simple laser cavity 25 of FIG. 2 in order to retro-fit adaptive optics into an existing laser. If used extra-cavity, the control system required for a tip-tilt mirror structure 110, 130 would either be based on an iterative search algorithm or configured for open loop control (the angle of the tip-tilt mirror will not affect the centriod deflection). Theoretically, the output from a PSD or Quad detector may be configured to provide the control signals for the tip-tilt mirror directly.

In a fifth preferred embodiment of the present invention, a mirror structure will now be described with reference to FIG. 8 in which a Hartmann mask is integrated with a self-deforming mirror.

Referring to FIG. 8, a sectional view of is provided through a mirror structure 150 in which an otherwise conventional self-deforming mirror, having an active layer 152 of deformable material such as PZT bonded to an optically transparent passive substrate 154 made from glass for example, with an intermediate common electrode layer (not shown in FIG. 8), has been modified by drilling an array of apertures 156 through the non-transparent layers, in particular the active PZT layer 152, to form a Hartmann mask. However, if a transparent single crystal piezo-electric material were to be used for the active layer 152, then the Hartmann mask may be implemented in a different way and may comprise an array or apertures formed only in the common electrode layer for example.

A partially transmissive reflective surface 158, for example of gold, is carried by the passive substrate 154, if necessary formed on an optically flat polished surface of a thin, optically transparent planarisation layer (not shown in FIG. 8) applied to cover the passive substrate 154. A partitioned electrode layer 160 is provided to enable selected regions of the active layer 152 to be energised via a flexi-circuit 162 of a type referenced above. An interconnect cable 164 connects to the flexi-circuit.

The deformable mirror, comprising the components 152 to 164, is supported preferably from below by means of a number of discrete passive flexible support elements 166 disposed around its periphery or, alternatively, by a continuous annular flexible support element 166. The support elements 166 are mounted on an annular section 170 of a rigid housing that comprises the annular section 170 fixed to a base plate 172. The rigid housing 170, 172 encloses a cavity 174 beneath the supported deformable mirror components.

An optical sensor 176 is provided within the rigid housing 170, 172, conveniently mounted within the cavity 174 on the base plate 172, comprising an array of discrete quad detectors or an array of CCDs fabricated on a wafer of silicon 178 with each discrete detector centred below the position of a respective aperture 156 of the Hartmann mask. Connection to the detectors of the sensor array 176 is preferably by means of a flexi-circuit and a further interconnect cable 180.

Light from an incident wavefront 155 passes through the apertures 156 of the Hartmann mask and through the cavity 174 to be detected by the sensor 176. The distance h separating the apertures 156 of the Hartmann mask and the sensor 176 is chosen according to the maximum wavefront slope that needs to be measured and the resolution of the sensor 176. The displacement of the centroid of a spot of light at the sensor 176 for an incident wavefront of slope θ is given by $$\Delta x = \theta h$$

The size of the apertures 156 is chosen to be large enough to let through enough of the incident light to be detectable by the sensor 176 but to be small enough so that "print-through" due to the apertures 156 is negligible at the mirror reflective surface 158. Furthermore, because the apertures 156 for the Hartmann Mask are being created in the active PZT layer 152, there will be a limit on the number of apertures 156 (Hartmann "windows") and hence sensor array size that can be used. As more and more Hartmann windows are added, the amount of PZT remaining in the active layer 152 to generate the required mirror curvatures will be reduced, restricting the voltage sensitivity of the device. The position of each aperture 156 in the active layer 152 preferably coincides with a gap between electrodes in the electrode layer 160 to minimise the number of apertures that need to be formed in the electrodes. Correspondingly positioned apertures are made in the flexi-circuit 162.

In this fifth preferred embodiment shown in FIG. 8, it has been found that deformation of the active PZT layer 152 does not significantly affect the displacement of the centroids of light spots at the sensor array 176.

Whereas the mirror structure 150 in this fifth preferred embodiment is shown comprising a deformable mirror with a single active PZT layer 152, a deformable mirror may be integrated with the structure 150 that uses other materials or is of a different type, for example a true bimorph or a symmetrical bimorph type of deformable mirror, or one of a type that is deformed using stacked actuators, PZT tubes, or MEMS devices.

The mirror structure 150 of this fifth preferred embodiment may be used to replace the first laser mirror 26 in the simple laser cavity 25 of FIG. 2. In such an application, while there may be a limit on the number of individual Hartmann windows that can be added, this may not be an issue for intracavity wavefront correction where the main aberration that requires correction is the thermal lensing of the laser rod 28. Depending on the geometry, the main distortions requiring correction will be either spherical or astigmatic. Spherical aberrations will be circularly symmetrical, and so may be determined using just one line of Hartmann windows/apertures 156 along a radius of the mirror. The astigmatic case may be determined with two orthogonal lines of Hartmann windows/apertures 156, each along a radius of the mirror.

The mirror structure 150 may be used extra-cavity but, as for the tip-tilt case mentioned above, the control system would be based either on an iterative search algorithm system or it would be configured for open loop control. In a further refinement, the mirror structure 150 may be used in a distributed control configuration where the control for a particular element of the deformable mirror is calculated based only upon the outputs of sensors in the sensor array 176 that are closest to the axis of the mirror element.

In a sixth preferred embodiment of the present invention, a mirror structure, substantially identical with the mirror structure 150 of the fifth embodiment above but incorporating a novel form of wavefront sensor, will now be described with reference to FIG. 9. The mirror structure in this sixth embodiment is particularly suited to applications in which it would be advantageous to maintain a reflected beam or a portion of a reflected beam along a desired path irrespective of the incident angle of the beam. This may be particularly advantageous for beam alignment purposes.

Referring to FIG. 9, a sectional view is provided through a mirror structure 190 in which an otherwise conventional self-deforming mirror structure, having an active layer 192 of deformable material such as PZT bonded to an optically transparent passive substrate 194 made from glass for example, has been modified by drilling an array of apertures 196 through the active layer 192 to form a Hartmann mask. A partially transmissive reflective surface 198, for example of gold, is carried by the passive substrate 194, if necessary formed on an optically flat polished surface of a thin, optically transparent planarisation layer (not shown in FIG. 9) applied to cover the passive substrate 194. A partitioned electrode layer 200 is provided to enable selected regions of the active layer 192 to be energised via a flexi-circuit 202 of a type referenced above. An interconnect cable 204 connects to the flexi-circuit.

The deformable mirror, comprising the components 192 to 204, is supported preferably from below by means of a number of discrete passive flexible support elements 206 disposed around its periphery or, alternatively, by a continuous annular flexible support element 206. The support elements 206 are mounted on an annular section 208 of a rigid housing that comprises the annular section 208 fixed to a base plate 210. The rigid housing 208, 210 encloses a cavity 212 beneath the supported deformable mirror components.

As with preferred embodiments described above, a small portion of light from an incident wavefront 213 is able to penetrate the reflective surface 198 and to pass through the apertures 196 made in the active layer 192. In the mirror structure 150 of the fifth preferred embodiment described above, the light passed through the respective apertures and was detected after travelling a distance h by corresponding optical position sensing devices. A series of measurements of displacement from such PSD sensors may be used by a controller executing, for example, a hill-climbing algorithm to deform the mirror by different amounts until a required direction of reflections or other objective is achieved. However, in this sixth preferred embodiment, an optical system may be integrated into the mirror structure 190 which is able to provide sufficient information to enable a control system to determine directly the deformations required to achieve a given direction of reflection over a particular region of the reflective surface 198, based upon sensor measurements available within the structure 190, irrespective of the direction of an incident beam. Such an optical system will now be described.

Firstly, an array of unit magnification inverting lenses is provided to correspond with the array of apertures 196, each inverting lens 214 comprising a single element ½ pitch graded index (GRIN) rod lens attached by its front focal plane surface to the lower surface (in practice to the surface of the flexi-circuit 202) of the deformable mirror. Each inverting lens 214 is aligned and attached so that the respective aperture 196 is positioned centrally on the front focal surface of the lens 214 before the lens 214 is attached, and the central axis of the lens 214 is coincident with that of the aperture 196. The inverting lenses 214 are thus suspended within the cavity 212 below the deformable mirror and so are free to move and tilt with the respective local region of the mirror as it deforms.

An array of Fourier lenses 216 is also provided within the cavity 212, each one arranged to receive light, at its front focal surface, emerging from a corresponding inverting lens 214. Each Fourier lens 216 is fixed relative to the corresponding inverting lens 214 and is separated from it by a small gap to allow room for relative movement between them, in particular for tilting. The central axis of each Fourier lens 216 is fixed in relation to the axis of the desired reflected beam path. Preferably, each Fourier lens 216 is attached, indirectly, to the base plate 210 of the housing such that when the deformable mirror is in an undeformed state the central axis of the Fourier lens 216 is aligned with the axis of the associated inverting lens 214 and hence with a respective one of the apertures 196; the state shown in FIG. 9.

Each Fourier lens 216 is mounted by its rear focal surface onto an optical sensor 218 arranged to detect light that passes through the Fourier lens 216. Each optical sensor 218 may be fabricated in a similar manner to the optical sensors described above, on a single wafer of silicon, or each sensor may be a discrete sensor; a quad detector, CCD or PSD for example. A transparent planarisation layer may be provided if required (not shown in FIG. 9) to cover each sensor 218 and so provide an optically flat mounting surface for the Fourier lens 216. Interconnection with the sensor elements 218 is preferably by means of a flexi-circuit 220 and a further interconnect cable 212.

The physical properties, in particular the planar focal surfaces of the inverting GRIN rod lenses 214 and the Fourier lenses 216, have been exploited in this sixth preferred embodiment to enable the optical system provided by each coupled inverting lens 214 and Fourier lens 216 to be integrated with a deformable mirror and position sensors 218. The advantages of this particular optical system and the way in which it operates in the context of the present invention will now be described with reference to FIG. 10.

Figure 10A:
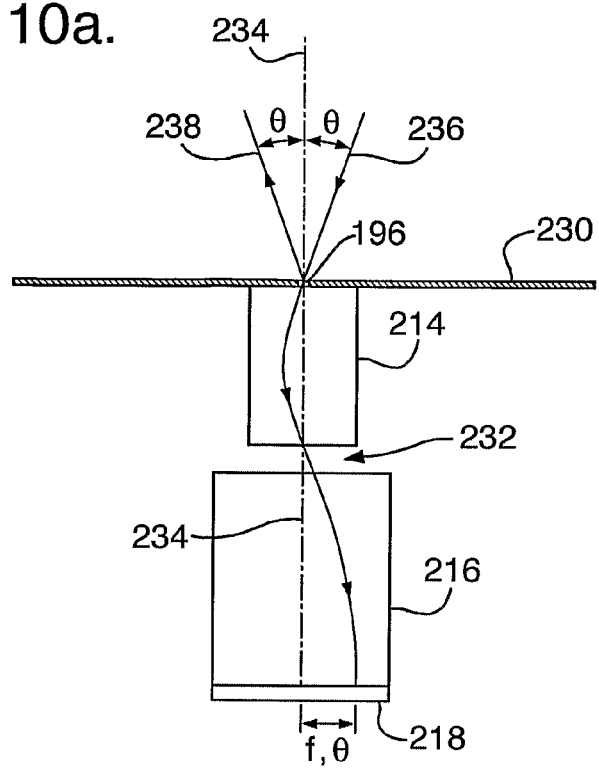

Referring initially to FIG. 10*a*, a sectional view is provided through a region of the mirror structure 190 of the sixth preferred embodiment above in the region of one of the apertures 196. The planar surface of an inverting GRIN rod lens 214 is attached to the deformable mirror 230 such that its axis is aligned with that of the aperture 196. A Fourier lens 216 with an attached optical sensor 218 is fixed relative to the inverting lens 214 and separated from it by a small gap 232. The Fourier lens 216 is positioned so that in the undeformed state of the deformable mirror 230 as shown in FIG. 10a, the axis 234 of the Fourier lens 216 is coincident with that of the inverting lens 214 and the aperture 196.

FIG. 10a shows a light beam 236 from a portion of an incident wavefront of light entering the aperture 196 at an angle θ from the axis 234. The path followed by the light 236 through the inverting lens 214 and the Fourier lens 216 is shown in FIG. 10a to the point where the light strikes the sensor 218, displaced a distance f.θ from the axis of the Fourier lens 216, where f is the focal length of the Fourier lens. Preferably, the point of reference when determining displacement for a spot of light detected by the sensor 218 is the centroid of the spot. Thus, knowing the focal length f of the Fourier lens 216 and the displacement of light from the axis 234 at the sensor 218 enables a controller to determine the angle of the incident wavefront 236 in that region and hence to generate signals for altering the curvature of the mirror 230 so that light 238 reflected from that region of the deformable mirror 230 may follow, for example, the axis 234 of the Fourier lens 216, or another preferred direction. Advantageously, the effect of adjustments to the local curvature of the mirror 230 may be seen directly at the sensor 218, as can be seen with reference to FIG. 10b.

Figure 10B:
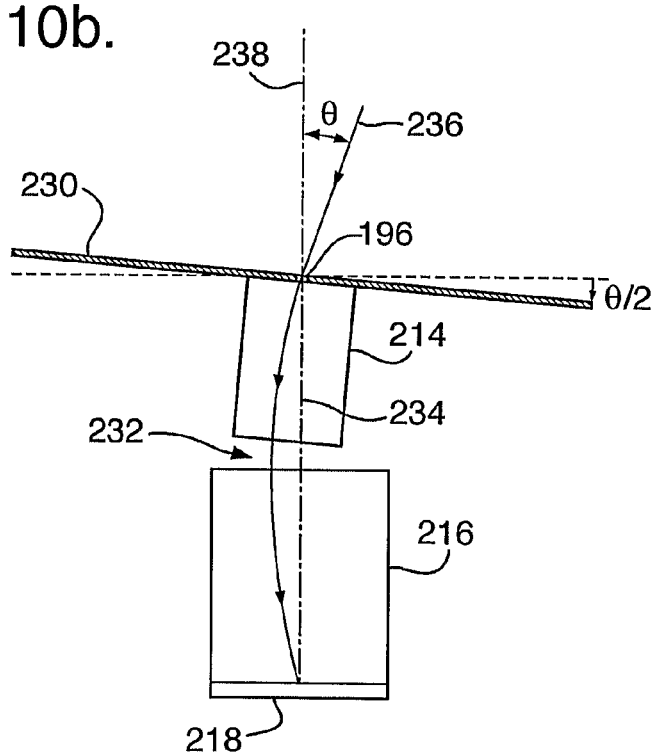

Referring to FIG. 10b, the effect of a local tilting of the reflective surface of the mirror 230 through an angle θ/2 can be seen to have directed reflected light 238 along the axis 234. When this has been achieved, the displacement of the spot of light at the sensor 218 is substantially zero. Thus, the mirror structure of this sixth preferred embodiment of the present invention may be used in a closed loop system to correct for wavefront distortions simply by minimising the displacement of light measured in selected sensors 218 or averaged across the sensors 218 of the mirror structure 190. It can be seen that in this position, the sampled beam always exits the inverting optics substantially parallel to the desired axis 234, irrespective of the value of θ. This results in a zero displacement in the back focal plane of the Fourier lens 216.

In a seventh preferred embodiment of the present invention, a variant on the mirror structure 190 of FIG. 9 will now be described with reference to FIG. 11 in which a tip-tilt facility is provided. Features in common with those of FIG. 9 are labelled in FIG. 11 with the same reference numerals.

Referring to FIG. 11, a sectional view is provided through a mirror structure 240 that is substantially identical with that shown in FIG. 9. However, whereas the deformable mirror components 192 to 202 in FIG. 9 are supported around their periphery by means of passive flexible support elements mounted preferably on an annular region of a rigid housing, in this seventh preferred embodiment the deformable mirror components 192 to 202 are supported preferably by means of three tip-tilt actuators 242 which may be controlled to help correct for lower order wavefront distortions indicated by the sensors 218, for example as indicated by the mean displacement of light spots at the sensors 218 across the aperture of the mirror, or to provide directivity to the mirror which may be particularly useful in optical communications applications. Of course, such an arrangement of lenses 214, 216 and tip-tilt actuators 242 may be used with a plane mirror rather than a deformable mirror in certain applications where correction for higher order wavefront distortions is not required.

The mirror structures 190, 240 of the sixth and seventh preferred embodiments above may be used to advantage for optical free space communications. In such an application, light carrying transmitted signals from a "remote" transceiver may be monitored and used to drive the deformable mirror and/or the tip-tilt actuators such that the reflected beam is always accurately aligned to the axis of a "home" transceiver. This arrangement would correct for distortion in the beam, for example tip-tilt, as a result of propagating through the atmosphere or movement in the mounting structure. Furthermore, by reflecting incident light signals transmitted by the "home" transceiver off the same mirror, the beam will be pre-distorted such that tip-tilt errors experienced on its propagation will be compensated. Hence less correction will be necessary at the "remote" transceiver, increasing alignment accuracy, and reducing signal drop-outs. If both transceivers are equipped with such mirror structures 190, 240, they will work in tandem to reduce beam misalignment and enhance overall system performance.

The main difference in this variation is that each mirror would be simultaneously illuminated by two beams; but only that light from the "remote" transceiver is required to be monitored. One method to isolate the two incident beams would be to operate the two transceivers at slightly different wavelengths and use a narrow band interference filter mounted onto the top of each Fourier lens 216 in the mirror structure 190, 240 tuned to the remote transceiver to reject light from the home transceiver.

In an eighth preferred embodiment of the present invention, a mirror structure will now be described with reference to FIG. 12 in which a reflected beam may be controlled to propagate automatically along the path of the incident beam.

Figure 12A:
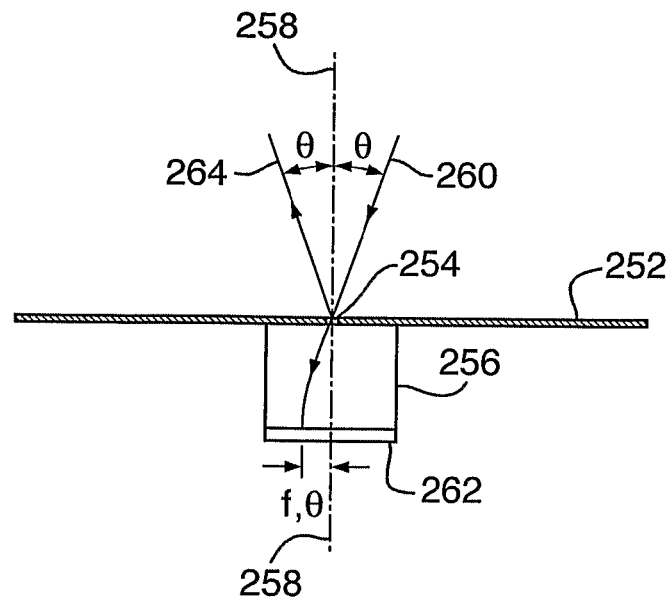

Referring to initially to FIG. 12a, a sectional view is provided of a portion of a mirror structure 250 in which a mirror 252, which may be a deformable mirror similar to that shown in FIG. 9, or a plane mirror, has a small aperture 254 provided, at least through any opaque layers within the mirror, and a ¼ pitch GRIN lens 256 is fixed to the mirror 252 by its front focal plane surface such that the central axis 258 of the lens 256 is aligned with the aperture 254. An incident light beam 260, arriving at an angle θ to the axis 258, is sampled by the small aperture 254 and light passing through the aperture 254 is directed by the lens 256 to a spot on an optical sensor 262 attached to the rear focal plane of the lens 256. The sensor 262 may be a PSD, for example. The Fourier function of the GRIN lens 256 causes the spot to be displaced laterally at the rear focal plane a distance f.θ from the axis 258 of the lens 256. This displacement may be measured by the attached sensor 262 and fed to a control system. As the lens 256 and the attached sensor 262 move with the mirror 252, the sensor 262 is able to provide a feedback signal directly linked to the orientation of the mirror's surface.

Figure 12B:
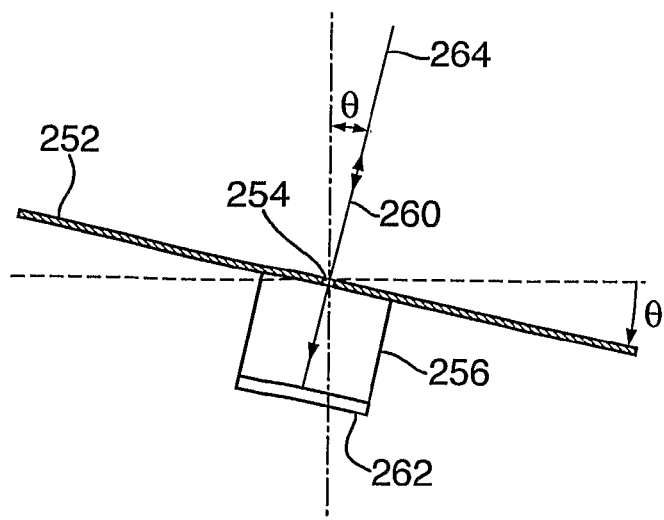

Preferably, the feedback signal provided by the sensor 262 may be converted into a proportional electrical signal that may drive the mirror actuators to tip or deform the mirror in a closed loop feedback arrangement. This will tend to drive the displacement at the sensor 262 to zero, and results in the mirror's reflective surface moving through an angle θ to the incident beam 260, as shown in FIG. 12b. A reflected beam 264 therefore retraces the same path as the incident beam 260, with the mirror 252 automatically acting as a retroreflector. Advantageously, such an arrangement avoids the greater costs of precision surfaces normally associated with corner cube based retroreflector devices.

Whereas the mirror structure according to this eighth preferred embodiment (FIG. 12) is able to maintain a reflected beam along its incident path, the mirror structures 190 or 240 of the sixth and seventh preferred embodiments described above are able to maintain a reflected beam along a desired path irrespective of the incident angle, for example, for alignment purposes. In order to achieve this, the mirror's surface had to be maneuvered though half the incident angle, $\theta/2$. This cannot be realised with a simple Fourier lens as provided in the mirror structure of FIG. 12, as there will always be a residual displacement of $f.\theta/2$ in the rear focal plane. Hence the mirror structures of FIGS. 9 to 11 are required in which additional unit magnification inverting optics are provided, attached to the mirror, in conjunction with a separate Fourier lens which is fixed in relation to the axis of the desired reflected beam path.

Whereas the sixth and seventh preferred embodiments of the present invention have discussed the use if GRIN inverting lenses and Fourier lenses in a mirror structure for the purpose of detecting the direction of an incident light beam, the use of such lenses in combination are not intended to be limited to use in a mirror structure and may be applied in a variety of different arrangements in which it is useful to detect the direction of incident light beams, whether or not mirrors are involved. Any conventional technique for sampling incident light may be used, such as a small aperture, whether or not associated with a mirror structure.

The mirror structures in preferred embodiments of the present invention, described above, have provided different examples of both fixed and deformable mirrors each having at least a part of an optical wavefront sensor integrated with them to enable light passing through the reflective surfaces of the mirrors to be detected for the purpose of wavefront correction. Those parts of a wavefront sensor have included at least a Hartmann Mask for a Hartmann sensor or the microlens array for a Shack-Hartmann sensor. Preferred positions of those parts within the mirror structures have been discussed but preferred mirror structures according to the present invention would not be limited to those positions. Furthermore, preferred sensor configurations have also been discussed, but preferred mirror structures according to the present invention are not limited to those configurations and alternative configurations are included within the scope of the present invention, as would be apparent to a person of ordinary skill in this field.

Whereas laser applications have been discussed, in particular, it will be clear that mirror structures according to the present invention may be applied to any field where the incident light levels are sufficient to enable wavefront measurement using those mirror structures.

The invention claimed is:

1. A mirror structure, comprising a mirror having a reflective surface arranged to allow a portion of incident light to pass therethrough and wherein the mirror structure has at least one component of an optical sensor integrated therewith, arranged to receive light that passes through said reflective surface,
   wherein the at least one component of the optical sensor is an optical detector arranged to detect a wavefront slope of the incident light at one or more points across the aperture of the mirror,
   and wherein a Fourier lens is disposed between the reflective surface and the optical detector, arranged to focus an incident beam of light, sampled from an incident wavefront, onto the optical detector at a position indicative of the wavefront slope.

2. The mirror structure according to claim 1, wherein the at least one component of the optical sensor is a Hartmann mask of an optical wavefront sensor.

3. The mirror structure according to claim 2, wherein the mirror further comprises a mirror substrate the said reflective surface applied thereto and wherein the Hartmann mask comprises an array of apertures formed in the mirror substrate.

4. The mirror structure according to claim 2, wherein the mirror further comprises a substantially transparent mirror substrate and wherein the Hartmann mask is formed as a distinct layer within the mirror structure.

5. The mirror structure according to claim 4, wherein the Hartmann mask is formed in a layer applied to a surface of the mirror substrate.

6. The mirror structure according to claim 3, wherein the Hartmann mask is covered by a substantially transparent planarisation layer to which the reflective surface is applied.

7. The mirror structure according to claim 1, wherein the at least one component of the optical sensor is a microlens array of a Shack-Hartmann wavefront sensor.

8. The mirror structure according to claim 7, wherein the microlens array is covered by a substantially transparent planarisation layer and the reflective surface is applied thereto.

9. The mirror structure according to claim 1, wherein the mirror is a self-deforming mirror having an active layer of deformable material coupled to a passive substrate.

10. The mirror structure according to claim 1, wherein the Fourier lens and the optical detector are attached to the mirror and arranged to move with the mirror.

11. The mirror structure according to claim 1, further comprising an array of Fourier lenses and associated optical detectors disposed across the aperture of the mirror, each one-arranged to sample a different portion of the incident wavefront.

12. The mirror structure according to claim 1, further comprising an inverting lens disposed between the reflective surface and the Fourier lens, wherein the inverting lens is attached to the mirror and arranged to move with the mirror, and the Fourier lens is fixed relative to the inverting lens and arranged to receive light passing therethrough.

13. The mirror structure according to claim 1, wherein at least a portion of the mirror structure is mounted on one or more tip-tilt actuators.

14. The mirror structure according to claim 2, wherein the mirror is a self-deforming mirror having an active layer of deformable material coupled to a substantially transparent passive substrate and wherein the Hartmann mask comprises an array of apertures formed in the active layer of deformable material.

15. The mirror structure according to claim 14, wherein the self-deforming mirror is supported by means of one or more passive flexible support elements coupled to a housing and wherein an optical detector is provided within the housing to detect the wavefront slope of the incident light at one or more points corresponding to positions of the apertures of the array.

16. The mirror structure according to claim 15, wherein a Fourier lens is disposed between an aperture of the Hartmann mask and the optical detector, arranged to focus an incident beam of light passing through said aperture of the Hartmann mask onto the optical detector at a position indicative of the incident wavefront slope.

17. The mirror structure according to claim 16, wherein the Fourier lens and the optical detector are attached to the mirror and so arranged to move with the mirror as it deforms.

18. The mirror structure according to claim 16, further comprising an inverting lens disposed between said aperture of the Hartmann mask and the Fourier lens, wherein the inverting lens is attached to the mirror and arranged to move with the mirror as it deforms, and the Fourier lens is fixed relative to the inverting lens and arranged to receive light passing therethrough.

19. A laser mirror comprising a mirror structure, the mirror structure comprising a mirror having a reflective surface arranged to allow a portion of incident light to pass therethrough and wherein the mirror structure has at least one component of an optical sensor integrated therewith, arranged to receive light that passes through the reflective surface.

* * * * *